US012675334B2

(12) United States Patent
Santaus et al.

(10) Patent No.: US 12,675,334 B2
(45) Date of Patent: Jul. 7, 2026

(54) CHECKPOINT SYSTEM FOR ACCELERATORS/QUANTUM COMPUTING FUNCTIONS-AS-A-SERVICE

(71) Applicant: Dell Products L.P., Round Rock, TX (US)

(72) Inventors: Benjamin Santaus, Somerville, MA (US); Victor Fong, Melrose, MA (US); Brendan Burns Healy, Whitefish Bay, WI (US); Rômulo Teixeira de Abreu Pinho, Niterói (BR)

(73) Assignee: Dell Products L.P., Round Rock, TX (US)

( * ) Notice: Subject to any disclaimer, the term of this patent is extended or adjusted under 35 U.S.C. 154(b) by 808 days.

(21) Appl. No.: 17/807,304

(22) Filed: Jun. 16, 2022

(65) Prior Publication Data

US 2023/0409406 A1    Dec. 21, 2023

(51) Int. Cl.
*G06F 9/50* (2006.01)

(52) U.S. Cl.
CPC .................................. *G06F 9/5055* (2013.01)

(58) Field of Classification Search
CPC .................................. G06F 9/5055; G06F 9/05
See application file for complete search history.

(56) References Cited

U.S. PATENT DOCUMENTS

| | | | | |
|---|---|---|---|---|
| 10,275,851 B1* | 4/2019 | Zhao | | G09G 5/363 |
| 10,817,337 B1* | 10/2020 | Richardson | | G06F 9/5005 |
| | | | | 718/104 |
| 2013/0125129 A1* | 5/2013 | Chakravorty | | G06F 9/4843 |
| | | | | 718/104 |
| 2015/0143381 A1* | 5/2015 | Chin | | G06F 9/505 |
| | | | | 718/104 |
| 2023/0236889 A1* | 7/2023 | Gupta | | G06F 9/3877 |
| | | | | 712/28 |
| 2023/0305888 A1* | 9/2023 | Zaykov | | G06F 9/4887 |
| | | | | 718/102 |

* cited by examiner

*Primary Examiner* — Aimee Li
*Assistant Examiner* — Harrison Li
(74) *Attorney, Agent, or Firm* — Workman Nydegger

(57) ABSTRACT

A system for accelerator functions as a service is disclosed. The system may receive a job that includes a computer (CPU) portion and an accelerator portion. When the accelerator portion is performed, an execution time associated with a time for the accelerator to return results is determined. Resources or a portion thereof allocated to the job, or the CPU portion are freed or reallocated to another job at least during the execution time. The job is queued to receive resources when the results are received from the accelerator.

14 Claims, 6 Drawing Sheets

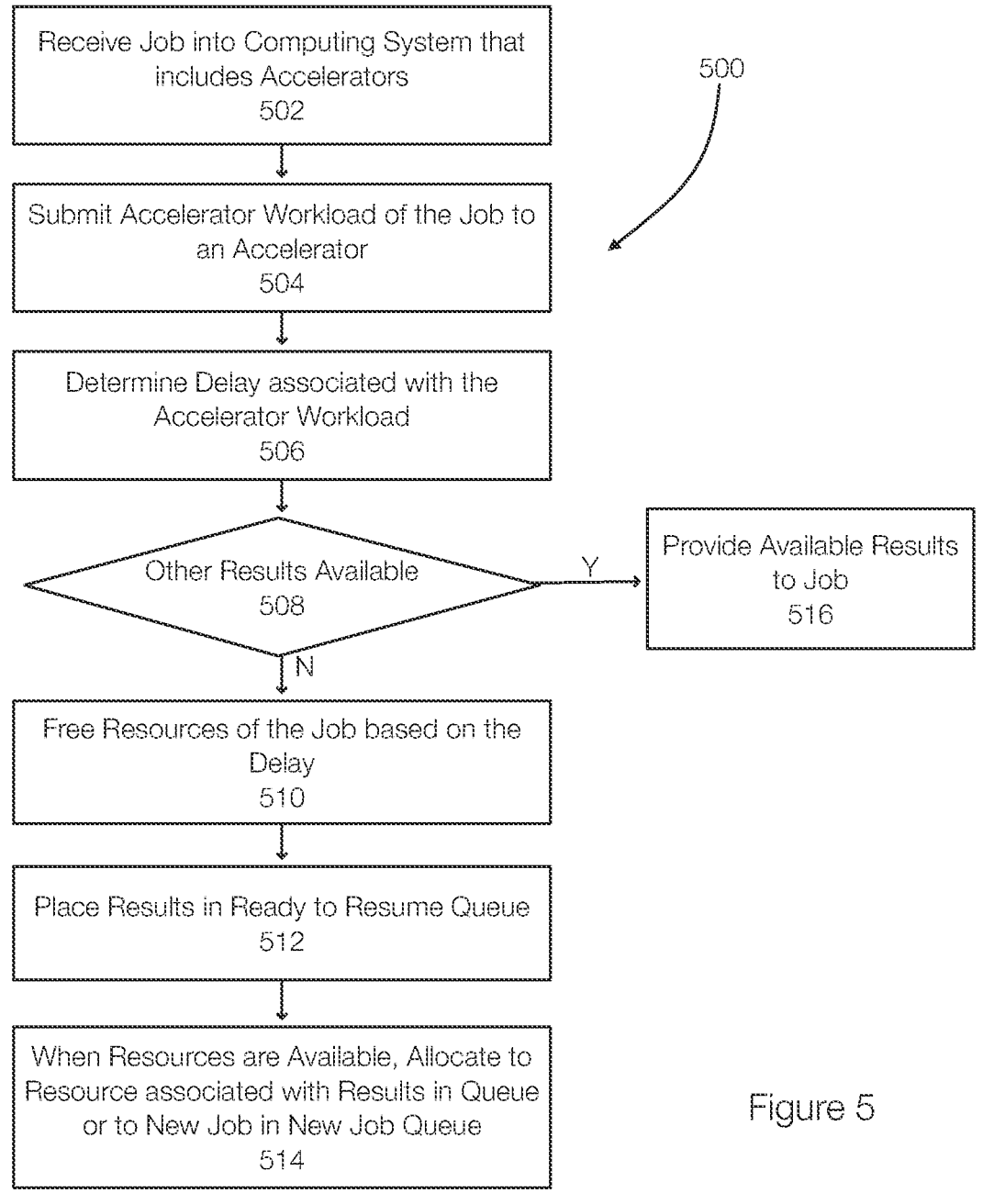

Receive Job into Computing System that
includes Accelerators
502

Submit Accelerator Workload of the Job to
an Accelerator
504

Determine Delay associated with the
Accelerator Workload
506

Other Results Available
508

Y

Provide Available Results
to Job
516

N

Free Resources of the Job based on the
Delay
510

Place Results in Ready to Resume Queue
512

When Resources are Available, Allocate to
Resource associated with Results in Queue
or to New Job in New Job Queue
514

Memory
602

NVRAM
604

Processor
606

Application(s)
614

Storage Media
608

UI Device
610

Data Storage
612

Accelerators
616

CHECKPOINT SYSTEM FOR ACCELERATORS/QUANTUM COMPUTING FUNCTIONS-AS-A-SERVICE

FIELD OF THE INVENTION

Embodiments of the present invention generally relate to computing functions as a service. More particularly, at least some embodiments of the invention relate to systems, hardware, software, computer-readable media, and methods for providing accelerator/quantum computing functions as a service and to managing/allocating resources for jobs that require accelerator/quantum functions.

BACKGROUND

Applications are examples of software that may run on computing hardware or resources. As the application executes, some of these resources are acquired by the application and used for the application's purposes. In order to improve the performance of an application, an accelerator such as a GPU (Graphics Processing Unit) may be used. Any application that invokes an accelerator, however, may be required to wait for the results to be returned from the accelerator before the application or process can continue.

A consequence of using an accelerator, however, is that the resources used by the application are kept idle while waiting for the results from the accelerator. This is particularly problematic when the accelerator is remote from the application and the resources used by the application.

Putting the application or process to sleep may not be an optimal solution because the application or process relinquishes control of its allocated resources. Resuming a sleeping application, once the results of the accelerator are available, can consume significant time. The time needed for the application to wake up and reacquire the resources that were relinquished may offset degrade the overall performance of the computing system.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 5 discloses aspects of performing accelerator jobs as a service and to allocating resources associated with the execution of jobs that use accelerators.

DETAILED DESCRIPTION OF SOME EXAMPLE EMBODIMENTS

Embodiments of the present invention generally relate to accelerator/quantum computing functions as a service. More particularly, at least some embodiments of the invention relate to systems, hardware, software, computer-readable media, and methods for managing/allocating resources in the context of using accelerators to perform functions or portions of jobs.

Embodiments of the invention relate to orchestration operations for allocating resources in a computing environment, including computing environments that include or have access to accelerators. The accelerators may be local or remote with respect to the application or process.

In general, embodiments of the invention relate to managing computing resources including when accelerators are used to execute a job. A job may include, by way of example, an application, a process, an operation, or the like. Further, jobs may be divided into CPU (Central Processing Unit) portions and accelerator portions.

Accelerators include, by way of example, QPUs (Quantum Processing Units), virtual QPUs (vQPUs) and graphic processing units (GPUs). A virtual QPU may include classical hardware (CPU, memory, etc.) configured to emulate a QPU.

QPUs and vQPUs can perform quantum computations. Performing a quantum computation, however, may include an iterative execution. The job may include a CPU or classical portion and a quantum portion. The iterative nature of some quantum computation systems may require time to complete. This may introduce periods of time in which the CPU portion of the application cannot continue in the sense that the job may not be able to perform further processing until the quantum results (or more generally the accelerator results) are available. The period of time is an execution time of the QPU portion of the job.

Figure 1:
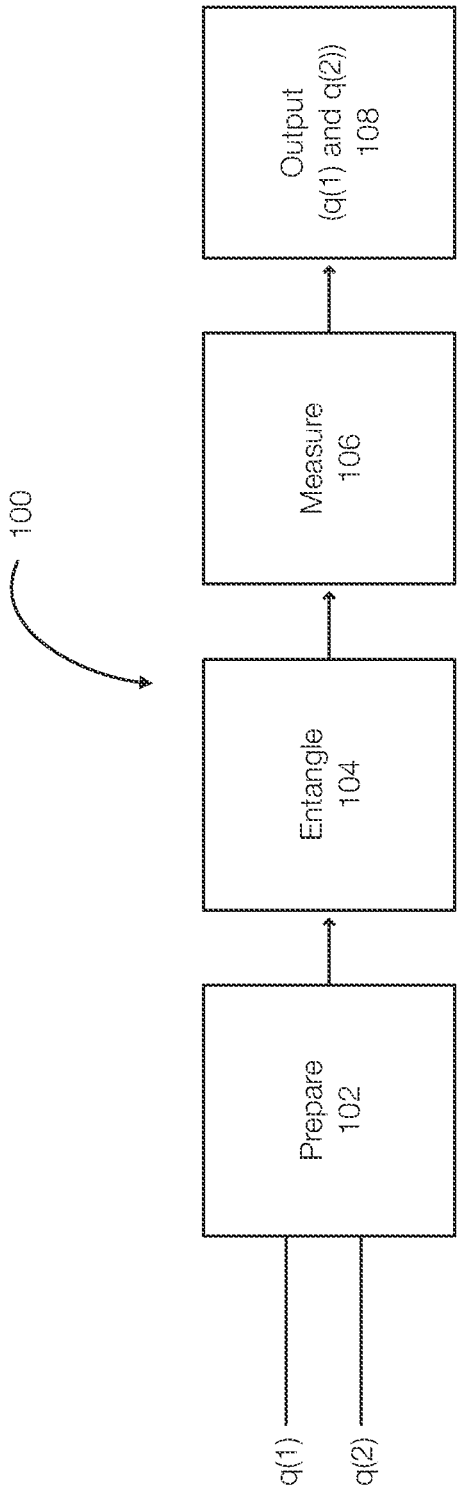
FIG. 1 discloses aspects of a quantum processing unit.

FIG. 1 discloses aspects of a quantum circuit that may be iteratively executed by a QPU. The quantum circuit 100 is provided by way of example only and embodiments of the invention are not limited to any particular type of quantum circuit. Generally, the circuit 100 may receive qubits (e.g., q(1) and q(2)) as inputs. The qubits may be initialized or prepared 102 to a particular state. Stated differently, the input qubits may be initialized based on parameters. In effect, the parameters can be viewed as the input to the circuit 100.

Once prepared, the circuit 100 can be operated or executed. Operating the circuit 100 a single time is referred to herein as a shot. In this execution, the qubits may be entangled 104 (e.g., using quantum gates or the like). The qubits are then measured 106 and recorded as output 108. The output is a bitstring of q(1) and q(2). Because the output 108 of the circuit 100 is probabilistic in nature, a given process may perform a plurality of shots (e.g., hundreds or thousands). The quantum circuit 100 is performed iteratively. The output 108 may be returned after all shots have been performed. The output 108 is commonly a distribution of bitstrings.

Quantum circuits, such as the circuit 100, can be used for various purposes. Quantum circuits may be used, by way of example only, to perform optimizations, machine learning, simulation, and the like. Performing large numbers of shots, however, requires time during which the job that called or required the QPU may be waiting for the output of the QPU.

Figure 2:
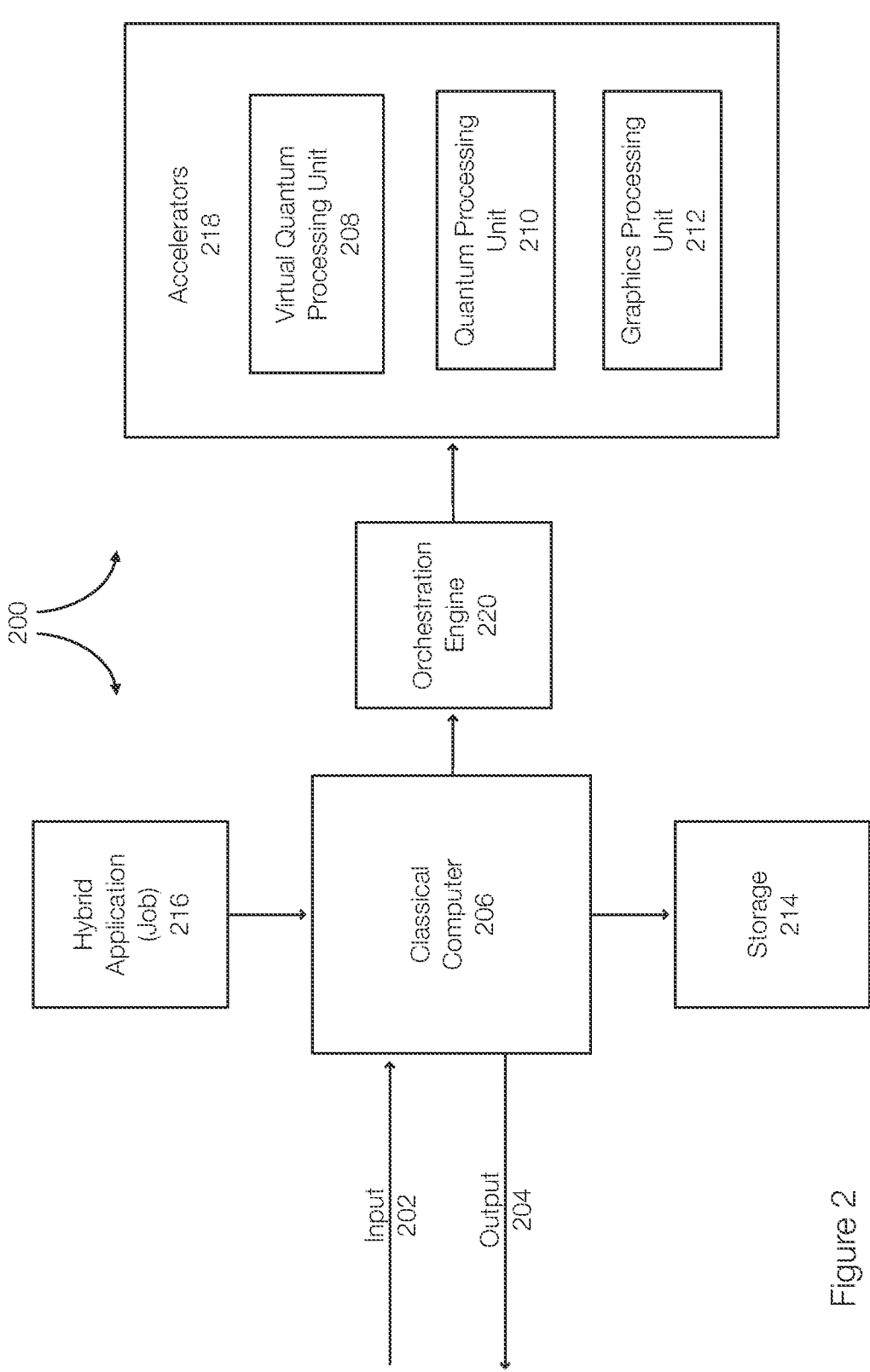
FIG. 2 discloses aspects of a hybrid computing system that includes classical hardware and accelerators.

FIG. 2 discloses aspects of a computing environment that includes classical computing units and accelerators that may include quantum processing units. The computing system 200 is configured to perform hybrid classical-quantum computing operations, referred to herein as a hybrid application or a hybrid process. The accelerators 218, represented by virtual quantum processing unit 208, quantum processing unit 210, and graphics processing unit 212, may participate in executing the hybrid application 216.

The orchestration engine 220 may be configured to coordinate the operation of a CPU portion of the hybrid application 216 (the portion of the hybrid application 216 executing in the classical computer 206) and an accelerator portion (the portion of the hybrid application 216 operating in the accelerators 218).

FIG. 2 illustrates a classical computer 206 (an example of a classical processing or computing unit) configured to execute a hybrid application 216 or other job. The computer 206 may represent a stand-alone machine, a server computer, a computing system including servers, a container, virtual machine, or the like. The computer 206 may be implemented in an on-premise system or in the cloud (e.g., a datacenter). The computer 206 may include one or more processors, memory, and other circuitry. The computer 206 may also be associated with a storage 214, such as a volume, a storage array, a disk drive, or the like or combination thereof.

The computer 206 may receive input 202 of the job 216 and generate output 204. The input 202 and the output 204 may depend on the application 216 or use-case. For example, the hybrid application 216, which may include classical and/or quantum components or portions, may be configured to train, execute, or optimize a machine learning model, perform cybersecurity, execute financing models, perform artificial intelligence, perform weather forecasting, or the like. Hybrid applications are not limited to these examples and embodiments of the invention are not limited to hybrid applications.

The accelerators 218 may include open-source accelerators and private offerings. The runtime characteristics, infrastructure requirements, and licensing models or costs of these accelerators 218 units vary. When executing the hybrid application 208 and when a quantum job is required, the quantum job may be performed in a quantum environment or accelerator, such as the quantum processing unit 210 or the virtual quantum processing unit 208. Further, multiple iterations are performed in the selected quantum processing unit at least because the outputs of quantum processing units are probabilistic in nature and often generate a probability distribution. When the quantum job is completed, results may be returned to the application 216 or to the computer 206.

Figure 3:
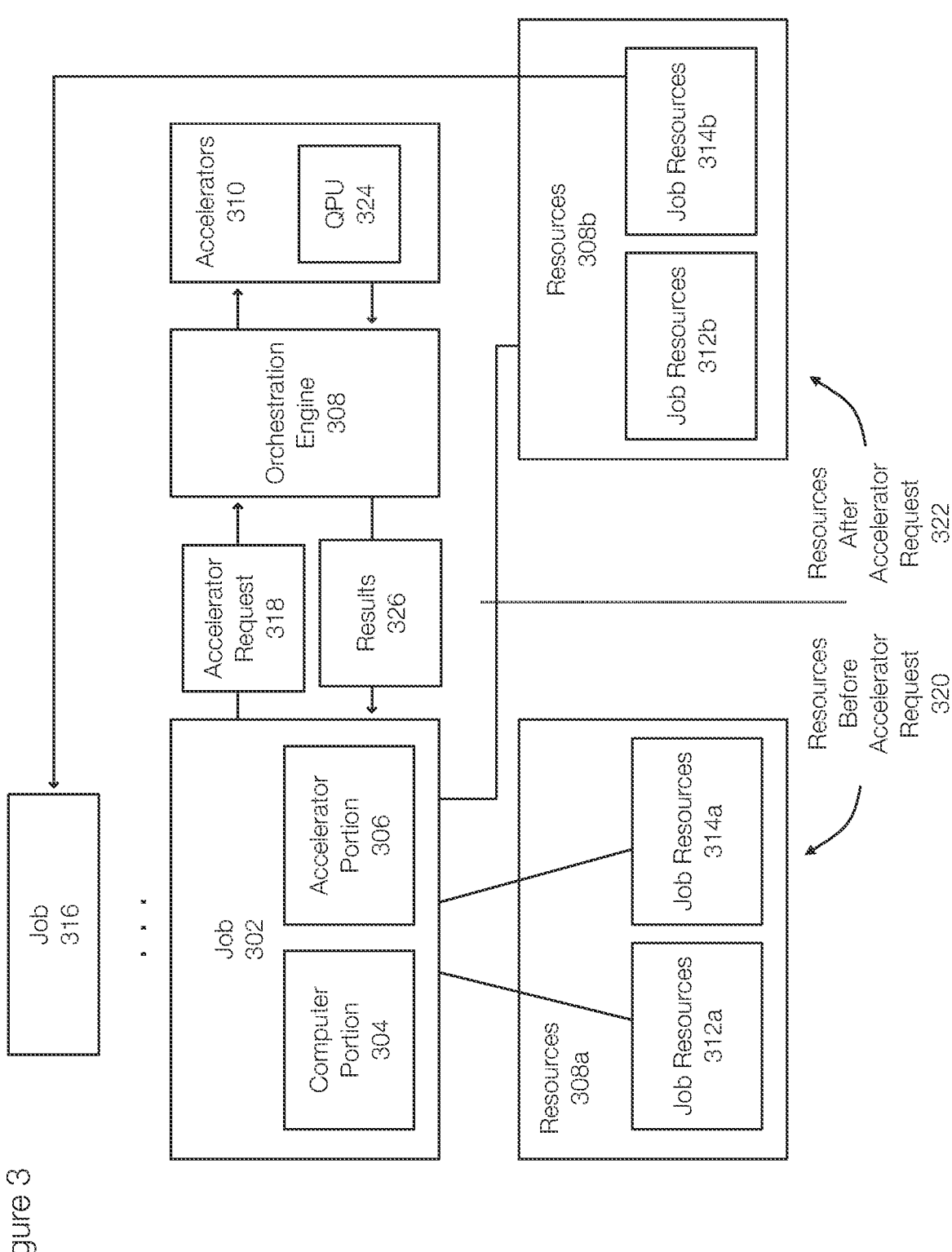
FIG. 3 discloses aspects of orchestrating job execution, including resource allocation, that includes accelerator functionality.

FIG. 3 discloses aspects of providing accelerators as a service. FIG. 3 illustrates a job 302 (e.g., a process, a workload, an application, a hybrid application). The job 302 may include a computer portion 304 configured to execute in classical hardware. The job 302 may also include an accelerator portion 306 configured to execute in one of the accelerators 310.

The orchestration engine 308 may be configured to submit, at the appropriate time, the accelerator portion 306 to an appropriate accelerator in the accelerators 310. For example, the accelerator portion 306 may include a quantum circuit that can be executed a QPU or a vQPU.

Prior to submitting the accelerator portion 306, the job 302 may be executing on a computer (e.g., the computer 206) and may consume resources 308a. The resources 308a represent the resources allocated to the job 302 and include the job resources 312a and the job resources 314b. Thus, the resources 308a represent the resources allocated and/or used the job 302 before 320 the accelerator request 318.

When the accelerator request 318 is generated by the job 302, the orchestration engine 308 submits the accelerator portion 306 to, for example, the QPU 324.

The orchestration engine 308 may include or use a machine learning model, which has been trained to estimate or infer an execution time associated with executing a job at the QPU 324 (and/or other accelerators), to determine how long the job 302 will need to wait for the results 326 of the accelerator portion 306 are returned by the QPU 324. Based on this execution time, the orchestration engine 308 may free resources associated with the job 302. More specifically, the orchestration engine 308 may free classical computing resources at least during the execution time of the QPU portion.

In this example, the resources 308b represents the resources 308a after the accelerator request 322. More specifically, the job resources 314a, now represented as job resources 314b, have been reallocated from the job 302 to the job 316. In this example, the job resources 312b, which correspond to the job resources 312a, remain with the job 302. In another example, both the job resources 312a and 314a could be reallocated to another job during at least the period of time in which the job 302 is waiting for the results 326 of the accelerator portion 306.

Once the results 326 are available, resources are reallocated to the job 302 when the resources become available. This allows resources to be freed for use during the execution of accelerator portions of jobs. Further, the job 302 may not be put to sleep, thereby avoiding delays associated with waking up the job 302.

Figure 4:
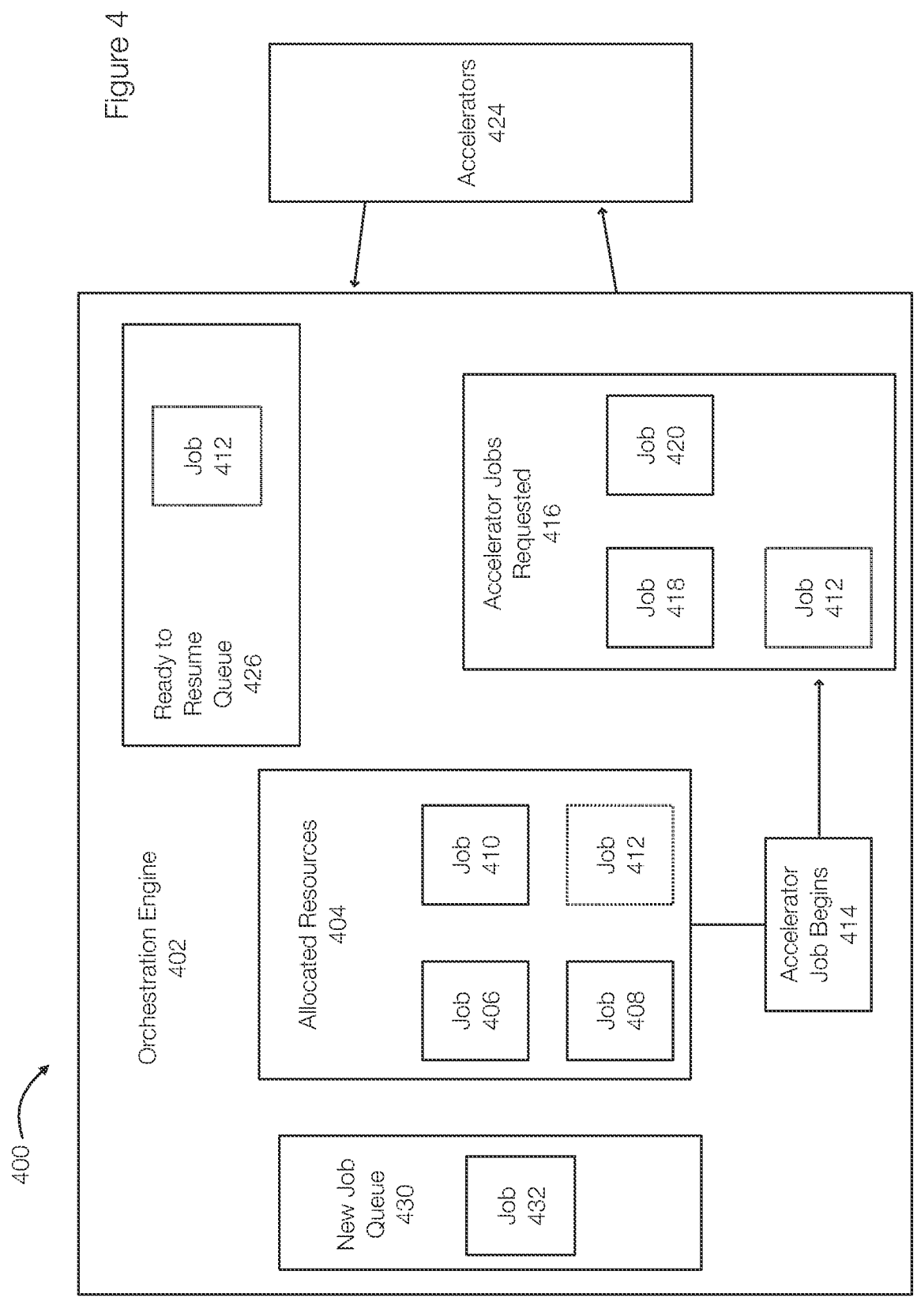
FIG. 4 discloses additional aspects of orchestrating job execution.

FIG. 4 discloses additional aspects of orchestrating jobs that may require or use accelerators. FIG. 4 illustrates a computing system 400, which is an example of a hybrid computing system, that includes an orchestration engine 402 that can be used in or implemented in, by way of example, a hybrid CPU-accelerator aaS environment such as Qiskit Dell Runtime (QDR).

In this example, the orchestration engine 410 may include and or manage various queues including a new job queue 430 and a ready to resume queue 426. The new job queue 430 is configured to hold jobs that have been submitted to the computing system 400. In this example, the new job queue 430 includes a job 432 that is waiting for resources. When resources are available, the orchestration engine 402 may allocate resources for the job 432, which executes using the allocated resources.

The orchestration engine 402 illustrates that the allocated resources 404 are the resources that have been allocated to the jobs 406, 408, 410, and 412. In this example, the allocated resources include classical computing resources such as processor, memory, and the like.

In one example, the jobs that have been allocated resources may include a CPU portion and an accelerator portion. If the job 412 includes an accelerator portion, there is a point during execution where an accelerator job begins 414. In this case, the job 412 is one of the jobs for which an accelerator job has been requested. In this example, the jobs 418, 420, and 412 are waiting for results and the accelerator portions of these jobs has been submitted to the accelerators 424 by the orchestration engine 402.

When an accelerator job is completed and results are returned, the job for which results have been returned is placed in the ready to resume queue 426. Assuming results have been returned from the accelerators 424 for the job 412, the job 412 is placed in the ready to resume queue 426. The orchestration engine 402 will allocate resources back to the job 412 when resources are available. This removes the job 412 from the ready to resume queue 426 and back to the allocated resources 404.

In this example, the resources allocated to the job 412 prior to the accelerator request are reallocated to another job while the job 412 waits for the results from the accelerators 424 as described in FIG. 3.

In one example, the queue 426 may be a first in first out (FIFO) queue. In another example, the jobs in the queue 426 may be prioritized. The jobs may be prioritized based on service level agreement requirements, start time, job process, or the like or combination thereof. Before the orchestration engine 402 reallocated resources to one of the jobs in the queue 426, the jobs may be evaluated to determine which job has the highest priority. Alternatively, the jobs in the queue 426 may be reprioritized periodically. This allows the orchestration engine 402 to simply allocate resources to the job at the front of the queue 426.

FIG. 5 discloses aspects of orchestration operations in a computing environment such as a hybrid computing environment. In the method 500, a job is received 502 into a computing system that includes accelerators, which may be remote (e.g., accessed over a network). Resources may be allocated to job if the resources are available. Otherwise, receiving 502 the job may include placing the job in a new job queue until the resources are available to execute the job.

The job may include a CPU portion (CPU job) and an accelerator portion (accelerator job). At the appropriate time, the accelerator portion of the job may be submitted 504 to an accelerator. For example, the accelerator portion may include a quantum circuit that is submitted to a QPU for execution.

An orchestration engine may, however, use a machine learning model to determine 506 the execution time needed to perform the accelerator portion. This execution time estimated by the machine learning model may include from submitting the accelerator portion to the accelerator and receiving results of performing the accelerator portion. The machine learning model (or a statistical model) may be trained using accelerator jobs or features of accelerator jobs such as qubits, accelerator type (virtual or hardware), memory requirements, number of shots, or the like or combination thereof. Once trained, the machine learning model can infer or estimate the execution time.

In one example, after determining 506 or estimating the execution time, the orchestration may determine whether the job submitting the accelerator portion to the accelerator has results available from previously submitted accelerator jobs. In other words, the orchestration engine may determine 508 whether other results are available for use by the job. If results are available (Y at 508), the orchestration engine may provide 516 the results to the job and the job CPU portion may continue executing and using the allocated resources.

If other results are not available (N at 508), resources or a portion of the resources currently allocated to the job may be freed 510 and allocated to another job.

When results of the accelerator portion are received, the results (or the job) are placed 512 or referenced in a ready to resume queue. The orchestration engine may also prioritize the jobs or results in the ready to resume queue.

When resources become available, the resources are allocated to the job/results having the highest priority in the ready to resume queue or to the front entry of the queue. The job receiving these resources can access the results of the accelerator portion and continue executing the CPU portion.

If the ready to resume queue is empty, the resources may be made available to a job in the new job queue.

In one example, the orchestration engine, which performs or orchestrates these operations, is never paused.

Embodiments of the invention thus relate to a mechanism for releasing resources allocated for a job while a remote accelerator is performing an accelerator portion of the job. The machine learning model allows the orchestration engine to estimate the execution time and, as a result, more effectively manage the resources of the computing system.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, job operations including executing CPU jobs, executing accelerator jobs, managing, or allocating resources, estimating execution times, or any combination thereof. More generally, the scope of the invention embraces any operating environment in which the disclosed concepts may be useful.

Example cloud computing environments, which may or may not be public, include storage environments and accelerators. Another example of a cloud computing environment is one in which accelerator functionality and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

Particularly, devices in the operating environment may take the form of software, physical machines, containers, or VMs, or any combination of these, though no particular device implementation or configuration is required for any embodiment.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: receiving a job in a computing system that includes access to an accelerator, the job including a CPU (Central Processing Unit) portion and an accelerator portion, submitting the accelerator portion to the accelerator by an orchestration engine, determining an execution time associated with executing the accelerator portion by the accelerator by the orchestration engine, freeing resources associated with the CPU portion to a second job at least during the execution time by the orchestration engine, receiving results of the accelerator portion from the accelerator by the orchestration engine, and allocating resources to the job when resources in the computing system are available by the orchestration engine.

Embodiment 2. The method of embodiment 1, further comprising freeing the resources associated with the CPU portion unless results from a previously submitted accelerator portion are available to the CPU portion.

Embodiment 3. The method of embodiment 1 and/or 2, further comprising placing the job in a ready to resume queue when the results are received back from the accelerator portion.

Embodiment 4. The method of embodiment 1, 2, and/or 3, further comprising allocating resources to a new job in a new job queue when resources are available, and no jobs are present in the ready to resume queue.

Embodiment 5. The method of embodiment 1, 2, 3, and/or 4, further comprising prioritizing jobs in the ready to resume queue based on one or more of service level agreements, start time, or job progress.

Embodiment 6. The method of embodiment 1, 2, 3, 4, and/or 5, further comprising determining the execution time using a machine learning model configured to estimate the execution time of the accelerator.

Embodiment 7. The method of embodiment 1, 2, 3, 4, 5, and/or 6, wherein the accelerator is one of a quantum processing unit, a virtual quantum processing unit, a field programmable gate array, or a graphics processing unit.

Embodiment 8. The method of embodiment 1, 2, 3, 4, 5, 6, and/or 7, further comprising receiving a request from the CPU portion for the results and updating the execution time based on time that has passed since the accelerator portion was submitted to the accelerator.

Embodiment 9. The method of embodiment 1, 2, 3, 4, 5, 6, 7, and/or 8, wherein the computing system includes a classical computing system and accelerators including quantum processing units, wherein the accelerators are remote from the classical computing system.

Embodiment 10. The method of embodiment 1, 2, 3, 4, 5, 6, 7, 8, and/or 9, wherein the orchestration engine is not paused during operation, further comprising executing the accelerator portion by a quantum processing unit.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'job', 'module', 'component', 'engine', or 'agent' may refer to software objects or routines or workloads that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
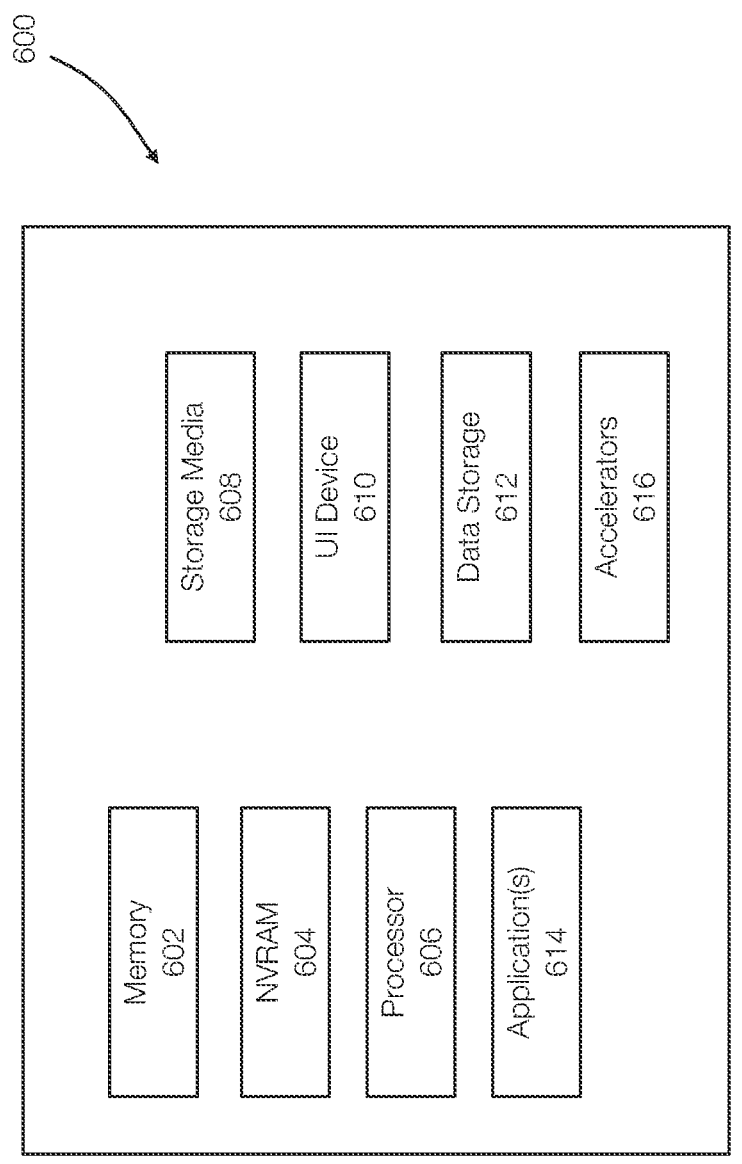
FIG. 6 discloses aspects of a computing device, a computing system, or a computing entity.

With reference briefly now to FIG. 6, any one or more of the entities disclosed, or implied, by the Figures and/or elsewhere herein, may take the form of, or include, or be implemented on, or hosted by, a physical computing device, system, or entity, one example of which is denoted at 600. The device 600 may also represent a virtual computing device, system, or entity as well as a hybrid computing system.

In the example of FIG. 6, the computing device 600 includes a memory 602 which may include one, some, or all, of random-access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid-state device (SSD) storage. As well, one or more applications 614 may be provided that comprise instructions executable by one or more hardware processors 606 to perform any of the operations, or portions thereof, disclosed herein. The device 600 may include or have access to accelerators 616, including, but not limited to GPUs, QPUs, field programmable gate arrays (FPGAs), vQPUs and/or other accelerators.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system that includes computing resources for executing CPU (Central processing unit) portions of jobs submitted to the system, a method comprising:

receiving a first job in a computing system that includes access to an accelerator, wherein the first job includes a first CPU (Central Processing Unit) portion and a first accelerator portion;

allocating first resources of the computing resources to the first CPU portion of the first job and executing the first CPU portion of the first job in the allocated first resources;

submitting the first accelerator portion to the accelerator by an orchestration engine when the first job requires execution of the first accelerator portion, wherein the allocated first resources of the first CPU portion are idle while waiting for results of the first accelerator portion;

determining an execution time associated with executing the first accelerator portion by the accelerator, wherein the execution time is determined by a model of the orchestration engine, wherein the model is trained on historical data and configured to estimate the execution time;

freeing only a portion of the first resources allocated to the first CPU portion;

10 allocating the portion of the first resources freed from the first CPU portion to a second CPU portion of a second job at least during the execution time determined by the orchestration engine;

receiving the results of the first accelerator portion from the accelerator by the orchestration engine;

placing the first CPU portions into a ready to resume queue, by the orchestration engine, when the corresponding results are received, wherein the ready to resume queue includes multiple CPU portions whose results from accelerators have been returned; and allocating additional first resources from the computing resources to the first CPU portion of the first job when the additional first resources are available, by the orchestration engine, to the first CPU portion, wherein the orchestration engine prioritizes the CPU portions in the ready to resume queue according to one or more of start time, service level agreements, and job process, wherein execution of the first CPU portion resumes using the additional resources when allocated to the first CPU portion.

2. The method of claim 1, further comprising freeing the first resources associated with the first CPU portion unless results from a previously submitted accelerator portion are available to the first CPU portion.

3. The method of claim 1, further comprising allocating second resources from the computing resources to a new job in a new job queue when the second resources are available, and no jobs are present in the ready to resume queue.

4. The method of claim 1, wherein the accelerator is one of a quantum processing unit, a virtual quantum processing unit, a field programmable gate array, or a graphics processing unit.

5. The method of claim 1, further comprising receiving a request, at the orchestration engine, from the first CPU portion for the results and updating the execution time based on time that has passed since the first accelerator portion was submitted to the accelerator.

6. The method of claim 1, wherein the computing system includes a classical computing system and accelerators including quantum processing units, wherein the accelerators are remote from the classical computing system.

7. The method of claim 1, wherein the orchestration engine is not paused during operation, further comprising executing the first accelerator portion by a quantum processing unit.

8. In a system that includes computing resources for executing CPU (Central processing unit) portions of jobs submitted to the system, a non-transitory storage medium having stored therein instructions that are executable by one or more hardware processors to perform operations comprising:

receiving a first job in a computing system that includes access to an accelerator, wherein the first job includes a first CPU (Central Processing Unit) portion and a first accelerator portion;

allocating first resources of the computing resources to the first CPU portion of the first job and executing the first CPU portion of the first job in the allocated first resources;

submitting the first accelerator portion to the accelerator by an orchestration engine when the first job requires execution of the first accelerator portion, wherein the allocated first resources of the first CPU portion are idle while waiting for results of the first accelerator portion;

determining an execution time associated with executing the first accelerator portion by the accelerator, wherein the execution time is determined by a model of the orchestration engine, wherein the model is trained on historical data and configured to estimate the execution time;

freeing only a portion of the first resources allocated to the first CPU portion;

allocating the portion of the first resources freed from the first CPU portion to a second CPU portion of a second job at least during the execution time determined by the orchestration engine;

receiving the results of the first accelerator portion from the accelerator by the orchestration engine;

placing the first CPU portions into a ready to resume queue, by the orchestration engine, when the corresponding results are received, wherein the ready to resume queue includes multiple CPU portions whose results from accelerators have been returned; and allocating additional first resources from the computing resources to the first CPU portion of the first job when the additional first resources are available, by the orchestration engine, to the first CPU portion, wherein the orchestration engine prioritizes the CPU portions in the ready to resume queue according to one or more of start time, service level agreements, and job process, wherein execution of the first CPU portion resumes using the additional resources when allocated to the first CPU portion.

9. The non-transitory storage medium of claim 8, further comprising freeing the first resource associated with the first CPU portion unless results from a previously submitted accelerator portion are available to the first CPU portion.

10. The non-transitory storage medium of claim 8, further comprising allocating second resources from the computing resources to a new job in a new job queue when the second resources are available, and no jobs are present in the ready to resume queue.

11. The non-transitory storage medium of claim 8, wherein the accelerator is one of a quantum processing unit, a virtual quantum processing unit, or a graphics processing unit.

12. The non-transitory storage medium of claim 8, further comprising receiving a request, at the orchestration engine, from the first CPU portion for the results and updating the execution time based on time that has passed since the first accelerator portion was submitted to the accelerator.

13. The non-transitory storage medium of claim 8, wherein the computing system includes a classical computing system and accelerators including quantum processing units, wherein the accelerators are remote from the classical computing system.

14. The non-transitory storage medium of claim 8, wherein the orchestration engine is not paused during operation, further comprising executing the first accelerator portion by a quantum processing unit.

\* \* \* \* \*